(12) United States Patent
Rosenszweig

(10) Patent No.: US 12,500,493 B1
(45) Date of Patent: Dec. 16, 2025

(54) ELECTRIC COIL WITH NOVEL INSULATING TAPE AND MANUFACTURING METHOD THEREFOR

(71) Applicant: Kencoil, Inc., Belle Chasse, LA (US)

(72) Inventor: Eran Rosenszweig, Belle Chasse, LA (US)

(73) Assignee: Kencoil, Inc., Belle Chasse, LA (US)

( * ) Notice: Subject to any disclaimer, the term of this patent is extended or adjusted under 35 U.S.C. 154(b) by 234 days.

(21) Appl. No.: 18/503,772

(22) Filed: Nov. 7, 2023

Related U.S. Application Data

(63) Continuation of application No. 17/150,763, filed on Jan. 15, 2021, now Pat. No. 11,848,590.

(60) Provisional application No. 62/961,436, filed on Jan. 15, 2020.

(51) Int. Cl.
*H02K 3/30* (2006.01)
*H02K 3/34* (2006.01)
*H02K 15/10* (2006.01)
*H02K 3/40* (2006.01)

(52) U.S. Cl.
CPC ............ *H02K 15/105* (2013.01); *H02K 3/30* (2013.01); *H02K 3/34* (2013.01); *H02K 3/40* (2013.01); *Y10T 29/49009* (2015.01)

(58) Field of Classification Search
CPC .. H02K 3/00; H02K 3/30; H02K 3/34; H02K 3/40; H02K 15/00; H02K 15/10; H02K 15/105; H02K 15/04; H02K 15/043; H02K 15/0431
See application file for complete search history.

(56) References Cited

U.S. PATENT DOCUMENTS

| | | | | |
|---|---|---|---|---|
| 3,735,168 | A * | 5/1973 | Anderson | H02K 3/32 336/209 |
| 6,359,232 | B1 * | 3/2002 | Markovitz | H01B 3/04 174/209 |
| 2008/0230253 | A1 * | 9/2008 | Williams | H02K 15/063 442/117 |
| 2016/0329123 | A1 * | 11/2016 | Mabuchi | H02K 3/40 |
| 2017/0033634 | A1 * | 2/2017 | Nikrandt | H02K 15/12 |
| 2018/0138772 | A1 * | 5/2018 | Calebrese | C09J 7/30 |

* cited by examiner

*Primary Examiner* — Tran N Nguyen
(74) *Attorney, Agent, or Firm* — Garvey, Smith & Nehrbass, Patent Attorneys, L.L.C.; Charles C. Garvey, Jr.; Fabian M. Nehrbass

(57) ABSTRACT

Electric coils and a method of insulating electric coils comprises copper wire with insulation, turn tape (e.g., B stage), film tape, and armor tape. In a preferred embodiment, the tape is hot-pressed after application of the B stage turn tape and again just prior to the application of the armor tape.

20 Claims, 7 Drawing Sheets

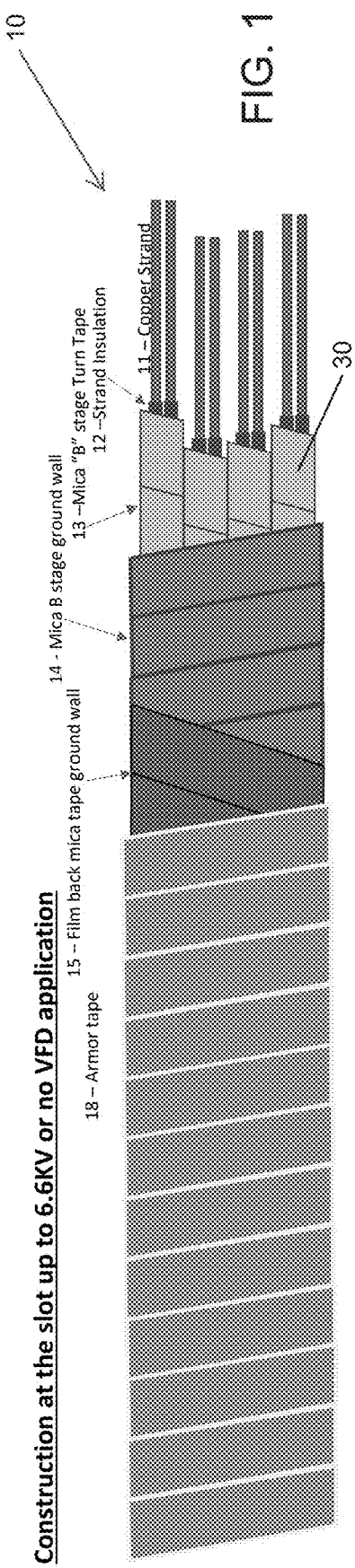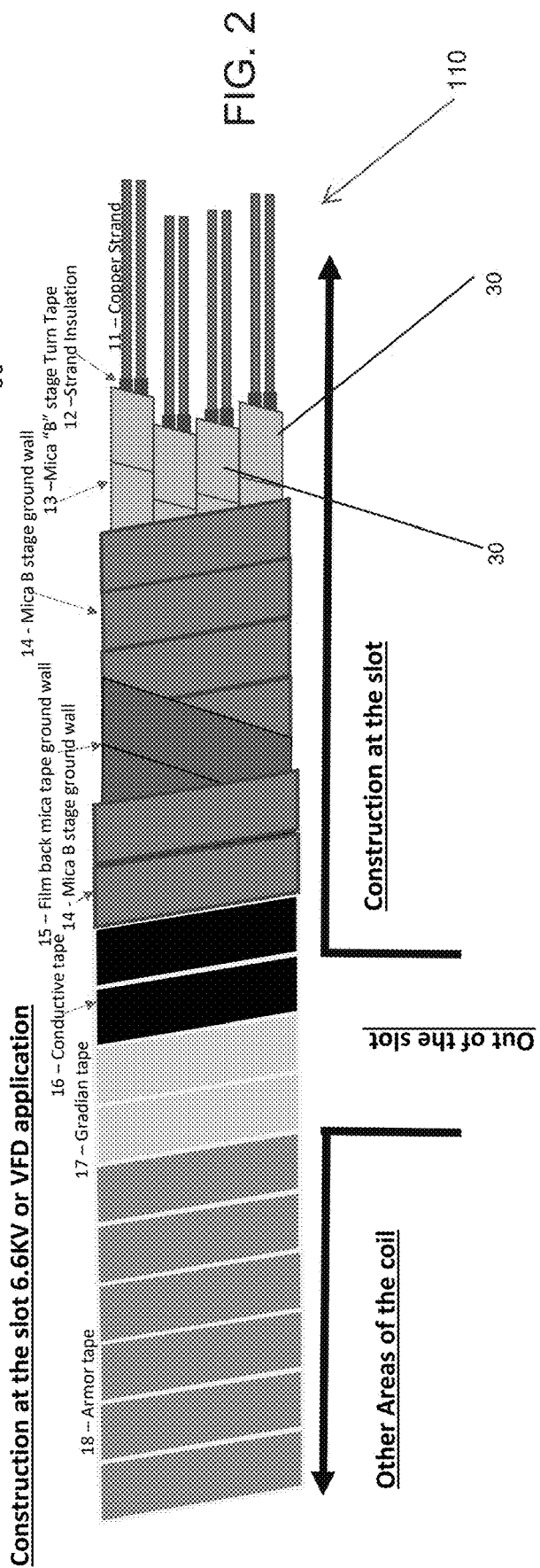

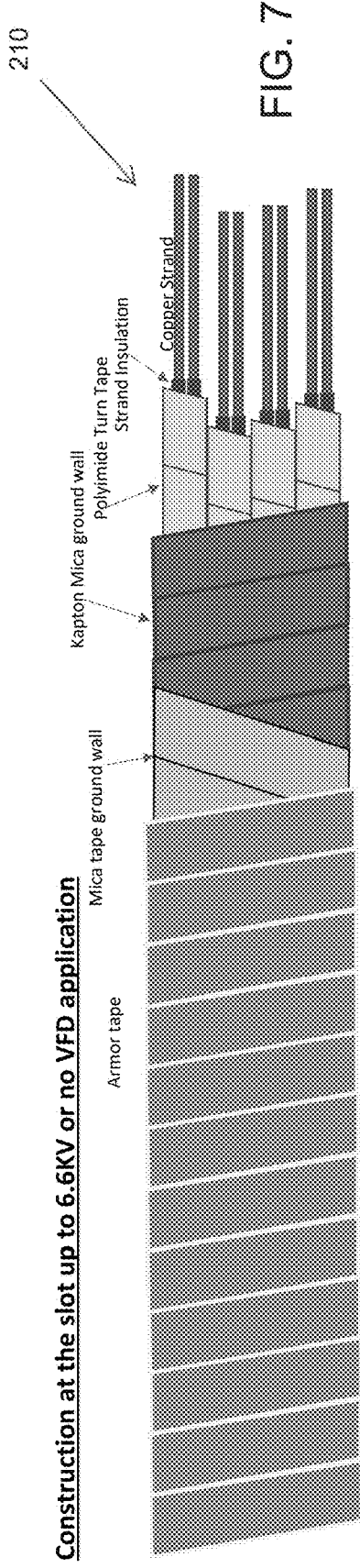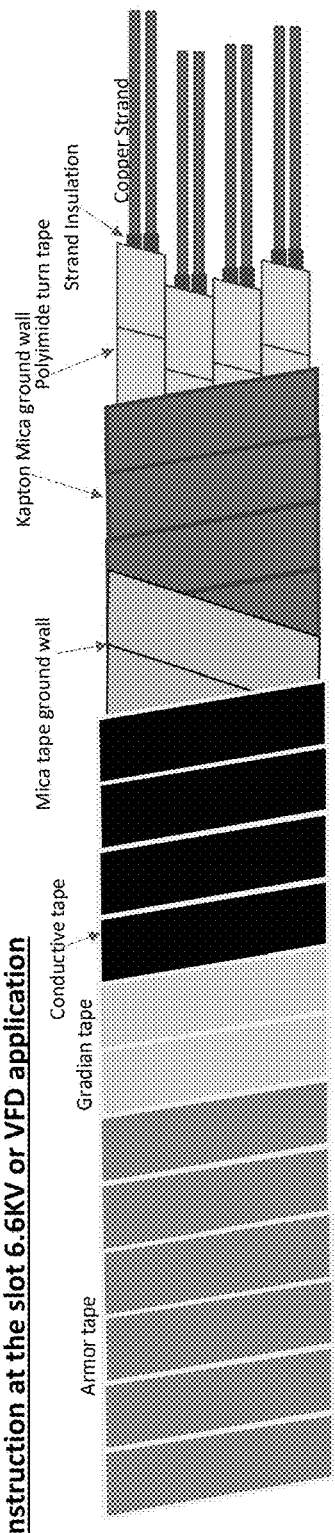
FIG. 7 — Construction at the slot up to 6.6KV or no VFD application
FIG. 8 — Construction at the slot 6.6KV or VFD application Raw Tapes Before VPI – slot section Construction at the slot up to 6.6KV or no VFD application Polyimide tape
Kapton Mica Tape  MICA / Kapton
Mica Tape
Armor
Conductive tape Construction at the slot 6.6KV or VFD application

ELECTRIC COIL WITH NOVEL INSULATING TAPE AND MANUFACTURING METHOD THEREFOR

CROSS-REFERENCE TO RELATED APPLICATIONS

This application is a continuation of U.S. patent application Ser. No. 17/150,763, filed 15 Jan. 2021 (issued as U.S. Pat. No. 11,848,590 on 19 Dec. 2023), which claims benefit of U.S. Provisional Patent Application No. 62/961,436, filed 15 Jan. 2020, each which is incorporated herein by reference.

Priority of U.S. Provisional Patent Application Ser. No. 62/961,436, filed 15 Jan. 2020, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to insulated stator coils and rotor coils. More particularly, the present invention relates to stator coils and rotor coils with improved insulation and a method of producing the same.

2. General Background of the Invention

Stator coils and rotor coils are a non-rotating and rotating part of an electrical device such as an electric motor, generator or the like. Such coils are typically covered with insulating tapes and conductive tapes. Patents have been issued that relate to stators or rotors and conductive tape. Examples are found in the below Table 1, each patent listed in Table 1 is hereby incorporated hereby by reference.

TABLE 1

| Patent No. | TITLE | ISSUE DATE |
| --- | --- | --- |
| 5,723,920 | STATOR BAR INTERNALLY GRADED WITH CONDUCTIVE BINDER TAPE | Mar. 3, 1998 |
| 7,973,446 | ELECTRICAL DEVICES HAVING TAPE WOUND COIL LAMINATE ROTOR OR STATOR ELEMENTS | Jul. 5, 2011 |
| 9,925,744 | INSULATING TAPE, METHOD FOR PRODUCING SAME, AND STATOR COIL | Mar. 27, 2018 |
| 10,199,136 | INSULATING TAPE AND PRODUCTION METHOD THEREOF, STATOR COIL, AND PRODUCTION METHOD THEREOF, AND ROTATING ELECTRIC MACHINE | Feb. 5, 2019 |

U.S. Pat. No. 10,199,136 to Mabuchi show generally an example of a rotating electrical machine (generator) having stator and rotor wherein an improved insulating tape and production method is discussed.

A prior art construction believed to be from 2017 can be seen in https://www.ips.us/hydrocoil/engineering/

Stators in rotating electric machines have stator coils. Rotors in rotating electric machines have rotor coils. Stator coils are made up of a coil conductor and a stator coil insulating material. Various methods of insulating coils exist in the prior art and exist in the field today.

The following possibly relevant U.S. Patent documents are incorporated herein by reference: U.S. Pat. Nos. 3,735,168; 5,723,920; 6,420,812; 7,973,446; 8,030,818; 9,925,744; 10,199,136; and U.S. Patent Application No. 2016/0329123. The following potentially relevant Foreign Patent document is incorporated herein by reference: European Patent Application No. 14880544.3.

Other stator coils produced by Applicant can be found at www.kencoil.com/form-wound-stator-coils/.

BRIEF SUMMARY OF THE INVENTION

The present invention relates to stator and rotor coils with improved insulation and methods of producing same.

One set of embodiments of the present invention presents improved stator coils and methods of producing same wherein the insulation of the stator coils has a longer life span than those known in the art, the insulation can withstand a higher voltage than those known in the art, and the insulation is impervious to outside environment, virtually void free and a compromise to vacuum pressure impregnated (VPI) coils.

In another set of embodiments of the present invention, Kapton tape is used turn to turn and the insulation is vacuum pressure impregnated.

The insulations of the various embodiments of the present invention can be applied to newly formed stator coils and rotor coils without limitation to size. The present invention allows tremendous withstand for turn-to-turn protection and dielectric to ground.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is a graphic representation of a preferred embodiment of the apparatus of the present invention;

FIG. 2 is a graphic representation of another preferred embodiment of the apparatus of the present invention;

FIG. 7 is a graphic representation of another preferred embodiment of the apparatus of the present invention;

FIG. 8 is a graphic representation of another preferred embodiment of the apparatus of the present invention;

DETAILED DESCRIPTION OF THE INVENTION

First Set of Embodiments

Figure 3:
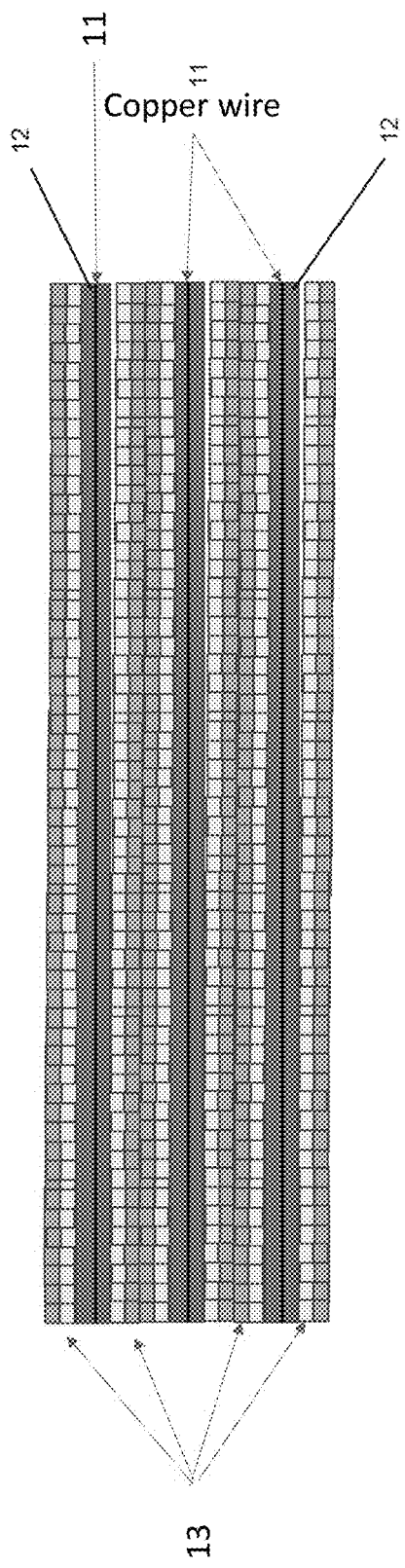
FIG. 3 is a graphic representation of the copper wire, insulation, and turn tape prior to slot consolidation.

In FIGS. 1-6, a first set of preferred embodiments of the apparatus of the present invention and method are shown, as described below.

FIGS. 1 and 2 show the layers of material that make up improved insulated coils 10, 110 of the present invention. In FIGS. 1 and 2, copper strands/wire 11 are coated with insulation 12. The insulation 12 could be polyimide, for example. Copper strands 11 coated with polyimide insulation 12 can be obtained directly from the manufacturer. Each copper strand is coated with insulation 12. Although eight copper strands 11 are shown in FIGS. 1 and 2, any number of copper strands could be utilized, depending on the specific properties of the coil desired. Each of the four sets of copper strands 11 and their insulation 12 shown in FIGS. 1 and 2 make up part of a turn 30. There are four turns 30 shown in FIGS. 1 and 2. Although there are two copper strands 11 per turn 30, the number of strands in each turn can vary greatly—the applicant has manufactured coils with up to 28 copper strands.

Turn tape 13, which is preferably B Stage tape, is then wrapped around each copper strand 11 with insulation 12. The turn tape 13 can be preferably applied with a tape machine. B Stage tape, or Mica B stage turn tape is commercially available. In a preferred embodiment, the B stage tape 13 comprises three-ply, B-staged, solventless epoxy bonded mica paper tape.

FIG. 3 shows a side cutaway of once the turn tape 13 has been wrapped around the copper strands 11 with insulation 12. FIG. 3 shows three turns and six copper strands 11 rather than the four turns and eight copper strands 11 shown in FIGS. 1 and 2, for clarity purposes only. As shown in FIG. 3, copper wires 11 with insulation 12 are individually wrapped with turn tape 13. Turn tape 13 comprises both epoxy and mica.

Figure 4:
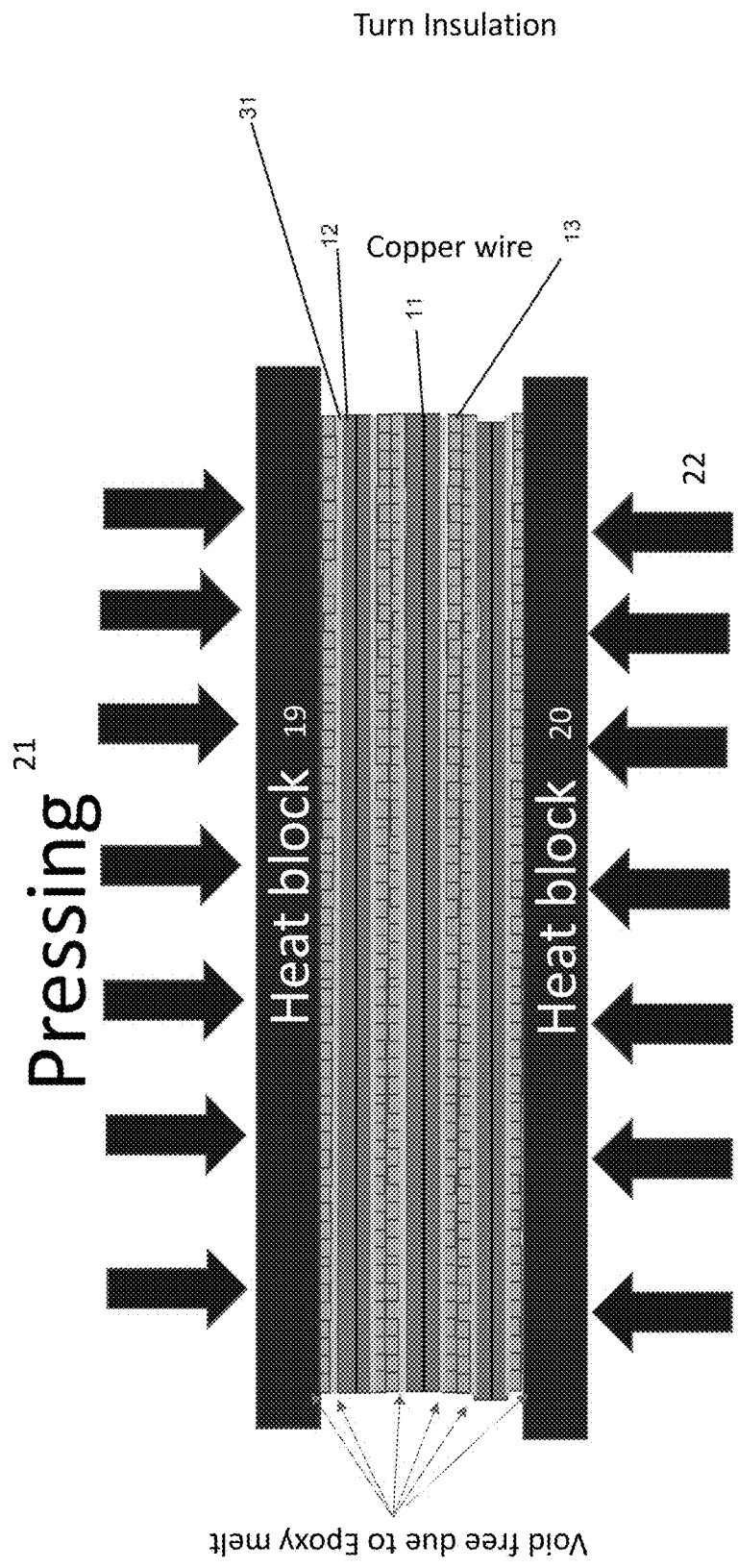
FIG. 4 is a graphic representation depicting the copper wire, insulation, and turn tape of FIG. 2 after processing.

In a preferred embodiment, once the turn tape 13 is applied, the insulated coil is then taken and hot pressed and consolidated, as shown in FIG. 4. FIG. 4 shows the turn insulation of FIG. 3 after processing wherein heat blocks 19, 20 have been applied as indicated by arrows 21, 22. As shown in FIG. 4, the epoxy layer flow/melt 31 allows the turn insulation to be void free.

Tape layers 14 and 15 are then applied after the application of turn tape 13, as shown in FIGS. 1 and 2. In certain embodiments, tape layers 14 and 15 are applied after processing. In other embodiments, processing has not yet occurred. Tape layer 14 is preferably a B Stage tape (the same tape as layer 13). Tape layer 15 is preferably a film back tape. Preferably, tape layer 14 and tape layer 15 are applied in opposite directions, as shown in FIGS. 1 and 2. In a preferred embodiment, there is one layer of B Stage tape 14 applied, then one layer of Film Back tape 15 then one layer of B Stage tape 14, as shown in FIG. 2. Although FIG. 1 depicts only one layer of tape 14 and one layer of tape 15 and FIG. 2 depicts two layers of tape 14 and one layer of tape 15, there can be multiple layers or combinations of the two tapes. Preferably, a second layer of B stage 14 is added after the film back 15 in higher voltage applications, as shown in FIG. 2. Tape layer 14 and tape layer 15 can be applied manually or with a tape machine.

Figure 5:
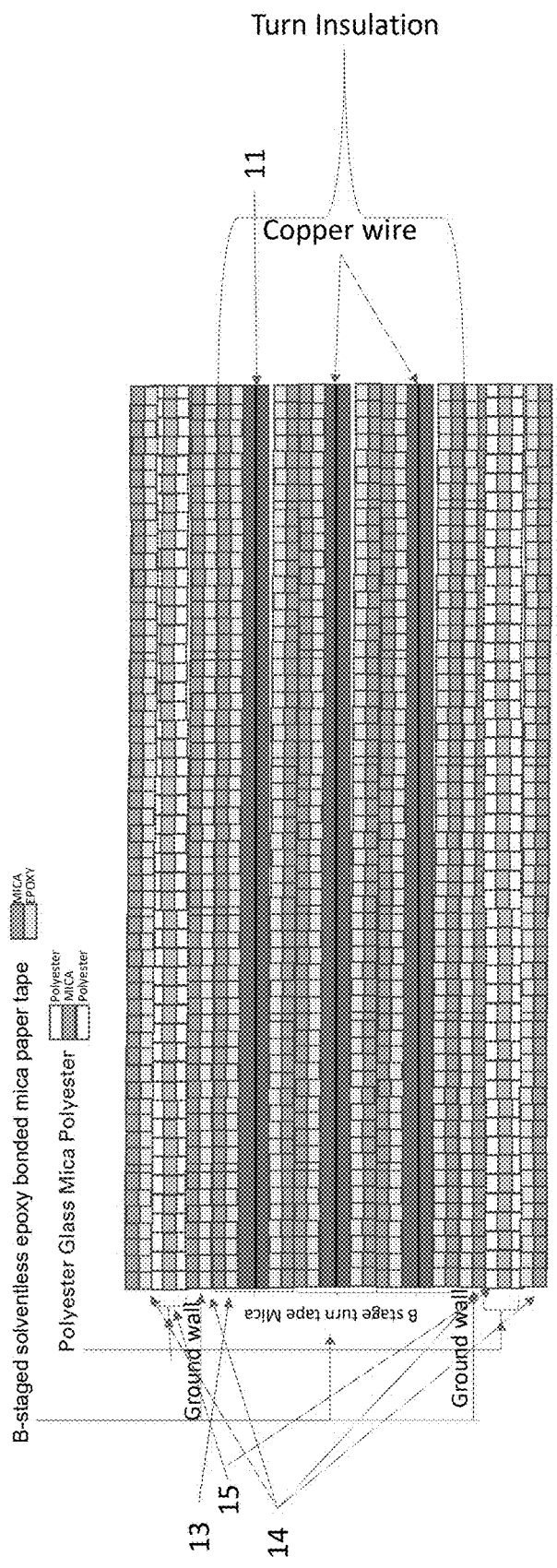
FIG. 5 is a graphic representation of a preferred embodiment of the present invention prior to any processing.

FIG. 5 shows the coil after insulation 12 and tape layers 13, 14, and 15 have been applied, without processing. However, it is understood that there can be hot pressing prior to the application of tape layers 14 and 15, as shown in FIG. 4. In such an embodiment, FIG. 5 would not represent the layers of insulation at that time, as the epoxy is not shown to flow/melt.

Figure 6:
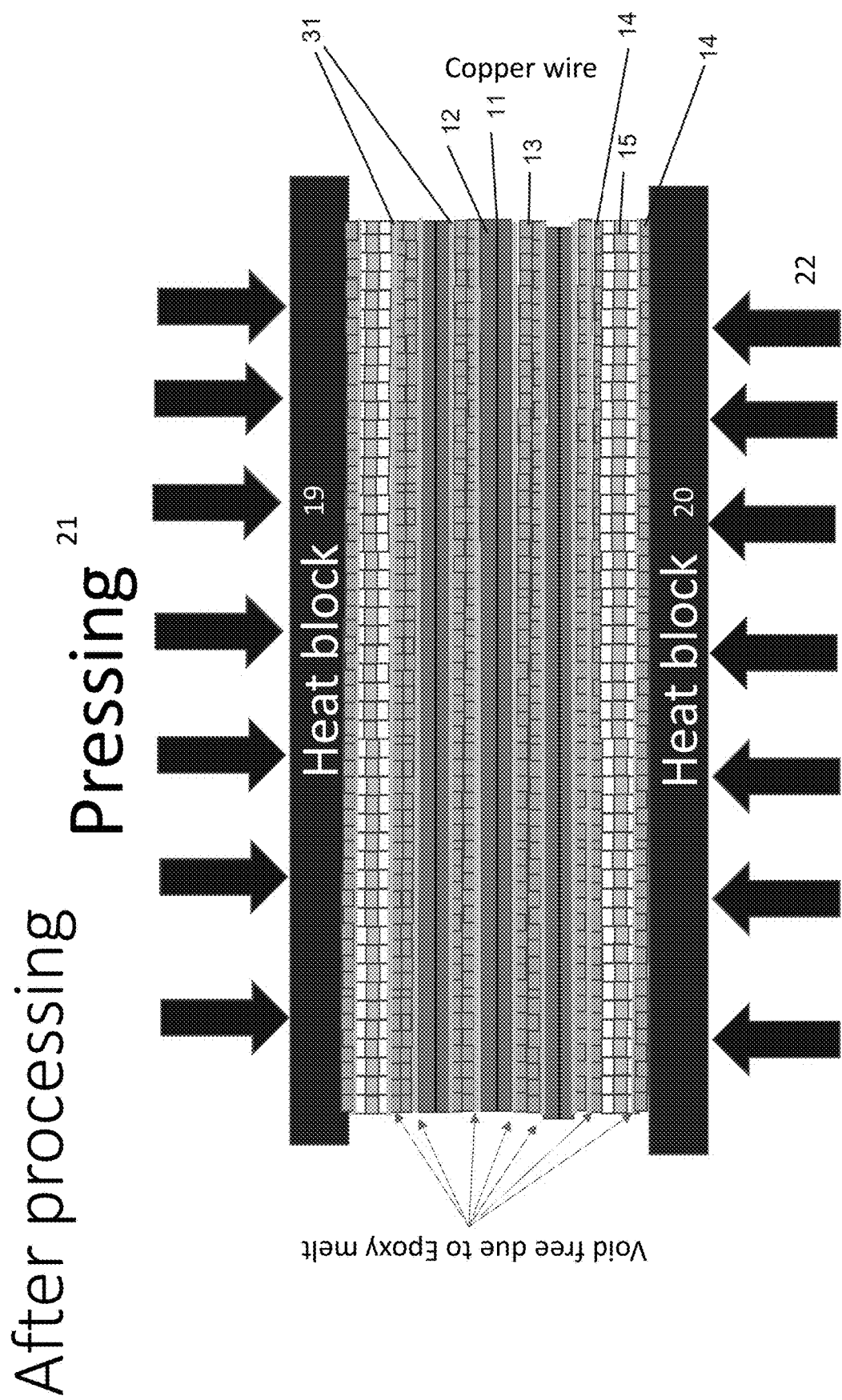
FIG. 6 is a graphic representation of a preferred embodiment of the present invention after processing.
Figure 9:
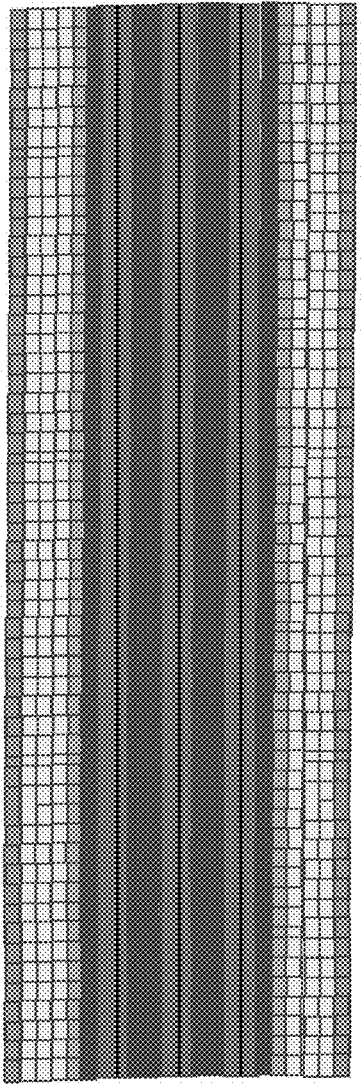
FIG. 9 is a graphic representation showing a preferred embodiment of the apparatus of the present invention.
Figure 10:
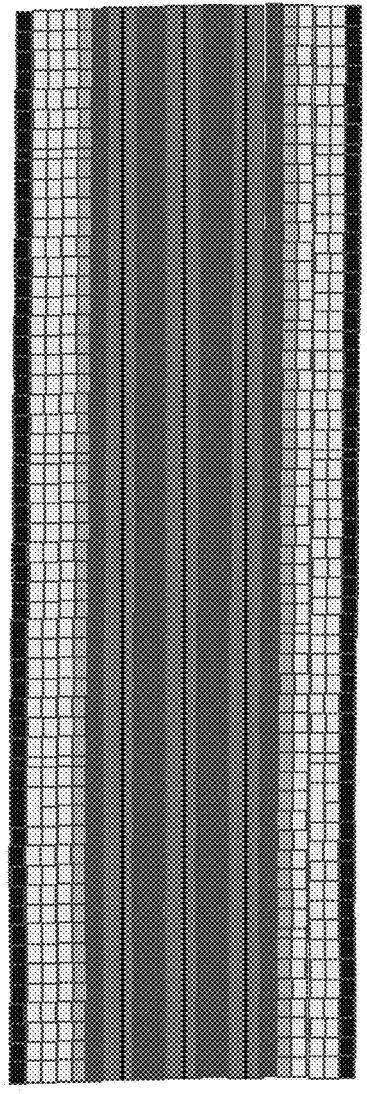
FIG. 10 is a graphic representation showing a preferred embodiment of the apparatus of the present invention.

In a preferred embodiment, the insulation comprising copper strand 11, insulation 12, B stage tape 13, B stage tape 14, and film back tape 15 is then hot pressed, as shown in FIG. 6. FIG. 6 shows the insulation after processing wherein heat blocks 19, 20 have been applied as indicated by arrows 21, 22. As shown in FIG. 6, the epoxy layer flow 31 allows the turn insulation to be void free.

As show in FIG. 2, in a preferred embodiment conductive tape 16, stress grading tape 17, and armor tape 18 can then be applied. Conductive tape 16 and stress grading tape 17 are not required in each embodiment of the present invention, as shown for example, in FIG. 1. Conductive tape 16 and stress grading tape 17 are added preferably when line voltage exceeds around 4,160 volts. These layers are also used when a variable frequency drive (VFD) is utilized.

In alternative embodiments, the insulation can be hot pressed only once, after layers 14 and 15 have been applied. Alternatively, the insulation can be hot pressed at various times throughout the process. Although conductive tape 17 is not always included, when included, it is preferably hot pressed.

In certain embodiments, further oven curing may be required based on voltage and application.

In another embodiment, ESSEX, REA or CWP custom HVY 200C film wire is wrapped with a VR 77984 B-staged mica turn tape and then hot pressed (for example, on a custom KC hot press). B-staged mica is applied (same as turn tape) odd layers and film back mica is applied on even layers. Every 4 layers is hot pressed to flow the epoxy. VR Fusaflex applied as armor and finished flash cured in a KC oven. Taped leads even number of layers as the slot (same materials). Ground wall layers dependent on voltage and space. Finished coil requires final curing after final insertion.

In an alternative embodiment to that embodiment shown in FIG. 1, bare copper wire could be utilized instead of copper wire covered with insulation. However, the finished product would have inferior dielectric properties to the preferred embodiment shown in FIG. 1. In another alternative embodiment, Kapton tape could be used over the bare copper, rather than polyimide.

Set forth below are certain specifications which apply to certain embodiments of the first set of embodiments of the present invention.

Scope 1.00 These specifications cover the general material, and fabrication standards employed by Kencoil in the manufacture of specific ac stator coils operating at all voltage ratings. This insulation system does not require a V.P.I. process.

Standards 2.00 All coils manufactured under various embodiments of the present invention are done so in accordance with the latest published IEEE and NEMA Standards unless otherwise specified.

Materials 3.00 All materials are compatible and unless otherwise specified will be compatible with standard none accelerated materials used in the industry. Based on the application, the Materials design can meet all temperature ratings.

4.00 Conductors used are high conductivity copper.

5.00 Conductor strand insulation shall be film covered wire with other supplemental turn insulation (if required), and will consist of three-ply, B-staged, solventless epoxy bonded mica paper tape for pressure molding processing (referred to as "Tape B").

Construction 6.00 Turn isolation requires a minimum of one layer of Tape B around each turn single strand or bundle.

6.10 The coil slot selection can be hot-pressed to ensure alignment of the turns.

7.00 Leads are taped or/and sleeved.

8.00 ground wall insulation 8.10 Depends on the voltage and other design considerations. The first layer of tape is Tape B, and then continues alternating of Tapes B & A (Tape A is Polyester Glass Mica Polyester, manufactured by bonding uncalcined Mica Paper, glass fabric and polyester film both sides using flexible Epoxy or modified acrylic resin) until the coil design required mica layers have been met.

8.20 Ground wall insulation outer layers for coils that do not require conductive tapes: The recommended tape is a B-staged epoxy-coated polyester glass tape that fuses during cure to provide a tough moisture and chemical seal. Insulation for coils can be easily flexed for winding, even pounded and scuffed without breaking the seal. The epoxy resin in the tape flows with heat during the curing process, while the polyester wrap threads shrink, pulling the tape down tightly. This insures a leak-proof seal without the need for any external pressure.

8.30 Coils that do not require conductive tape will be designed based on customer specifications.

8.40 connection insulation, it is recommended to follow the coil insulation sequence and tapes in the connections.

8.50 coil curing (solventless tape). The wound stator needs to be fully cured at 300 F for 12 hours.

By following the described insulation system tape B will impregnate tape A during the bake time which will result in a void free insulation system and a highly flexible coil during the winding process.

The solventless epoxy from tape B is flowing and curing at 300 F, after the back cycle no mechanical adjustment should be applied to the coils or connections.

This system does not require a VPI process or B stage hard coil tedious manufacturing process. This system increases the flexibility of winding that a VPI coil has and the simplicity that a B stage coil has after the winding process is completed and with superior dielectric properties.

In one embodiment, the insulation comprises wire conductor (for example, 200c heavy film and can be a heavy film of at least 200c, turn tape (B staged tape), bond tape with a shrink tape applied and then hot pressed (for example, hot presses such as those manufactured by KC) for a predetermined time at a predetermined temperature (for example, between about 3 and 25 minutes at a temperature of between about 250 and 350 degrees Fahrenheit). The time and temperature can vary (for example, from about 4 to 6 minutes) and the temperature can range (for example, between about 275 to 350 degrees Fahrenheit), depending on the specific product sought.

In a second embodiment, there is application of the ground wall and armor and hot pressing (for example, in KC presses) for a few minutes (for example, between about 5 and 7 minutes) at a predetermined temperature of between about 250 and 350 degrees Fahrenheit. More preferably, the hot pressing occurs at a temperature of between 280 and 310 degrees Fahrenheit. Even more preferably, the hot pressing occurs at a temperature between 285 and 300 degrees Fahrenheit. Most preferably, the hot pressing occurs at a temperature of about 292 degrees Fahrenheit. The hot pressing specifications can be applied to any of the aforementioned embodiments, depending on the specific product sought.

Second Set of Embodiments

A key benefit of a second set of embodiments of the present invention is that they provide extended motor life. FIGS. 7-10 show certain preferred embodiments of a second set of embodiments.

In certain preferred embodiments of the second set of embodiments of the present invention, a standard wire product (for example, Custom HVY Build 200C film wire) (alternatively could use other film wire, but film wire used is preferably at least 200c) is utilized. The Custom HVY Build 200C film wire may be purchased from Essex https://essexwire.com/), REA (https://www.reawire.com/website where product is available), or Craig Wire Products (CWP) (https://www.craigwire.com/).

Turn tape with a special class c film tape (for example, Polyamideimide tape purchased from TSK Solutions) is then wrapped by a turn tape machine. It is preferably wrapped half-lapped by a turn tape machine (preferably, it is half-lapped 1-2 layers). Alternatively, Kapton® tape (polyimide film tape) by Dupont™ can be used. However, the preferred turn tape is an improvement over the prior art Kapton® tape because of its dielectric superiority in this application.

The loop is then taped with a bond tape (preferably, 1510 TX bond tape purchased from VR) (Von Roll) (https://www.vonroll.com/). The bond tape is then hot pressed (in one embodiment), for example, by using a KC custom manufactured hot press.

For the ground wall, a Mica Kapton tape is first wrapped around the coil 1-2 time(s). Then, a VPI Mica tape, (a 180 gram with 6-10% binder with glass backing tape (available at VR or Cogebi, for example)) is utilized. Mica tape from 75-180 grams with 6-22% binder with glass backing tape may be utilized as well, though not with equal results.

Dacron lead seal (placed between lead and body of coil and taped into the coil itself—prevents resin from flowing out once resin has been introduced to the coil) (available by Essex, for example) is installed with sleeved leads (for example, by Atkinson Pierce purchased from Essex).

An armor layer is then added to the coil. The armor layer serves to protect the mica from damage as it is moved and when inserted into a motor. Preferably, it is either standard glass (for example, 5 or 7 mil treated glass) or Dacron and is by TSK (Dacron) and glass by Electrolock.

The stator coil can be formed in its desired shape after it has been looped (after the turn tape has been applied).

In various embodiments of the second set of embodiments, the amount of ground wall is dependent on voltage and physical space. For example, in one embodiment, there could be 3.5 layers in the slot and 3 layers on leads. There could be numerous variations based on the geometry of the motor. The coil must be Vacuum Pressure Impregnated (preferably, after the coil has been wound into the motor and connected). The Vacuum Pressure Impregnation can be done by a motor shop coil purchaser (for example, the company Scott Armature).

The C class tape is wrapped around the conductor. In a first embodiment, a Mica Kapton tape is first wrapped around the coil 1-2 time(s). However, the present invention is not limited to wrapping the coil 1-2 time(s). The amount of wrapping is dependent on the voltage protection required and geometrical limitations of the coil/motor. The special C class tape is wrapped by machine around the conductor as the coil is looped. Although other tapes may be utilized in place of Polyamideimide tape purchased from TSK Solutions, such as Kapton® by DuPont™, the other tapes are not as preferred because of inferior dielectric properties.

In another embodiment of the second set of embodiments, the coil is not hot pressed, but rather, is cold pressed for alignment and then a Polyamideimide film tape is placed into the slot. Preferably, it is placed every four inches to hold the uniformity of the coil.

Both hot press and non hot press will have 1-2 layers of Kapton® mica ½ lapped in the slot. The remaining room is filled before armor with the calculated number of turns of VR 877 VPI mica tape ½ lapped in slot and end turns. Glass or Dacron is applied as the armor layer is lapped as necessary for fit around the coil.

Set forth below are certain specifications which apply to certain embodiments of the second set of embodiments.

Scope
 1.00 These specifications cover the general material, and fabrication standards employed by Kencoil in the manufacture of certain stator coils operating at all voltage ratings. This insulation system requires a V.P.I. process utilizing 100% solids resin.

Standards
 2.00 All coils manufactured under various embodiments of the present invention are done so in accordance with the latest published IEEE and NEMA Standards unless otherwise specified.

Materials
 3.00 All materials are compatible and unless otherwise specified will be compatible with standard none accelerated materials used in the industry. Based on the application, the Materials design can meet all temperature ratings.
 4.00 Conductors used are high conductivity copper.
 5.00 Conductor strand insulation shall be film covered wire with other supplemental turn insulation, and will consist of polyimide film turn insulation.

Construction
 6.00 The loops have the lead insulation wiped clean to bare copper; are spread to proper shape and checked for uniformity.
 7.00 Leads are taped or/and sleeved.
 8.00 ground wall insulation
 8.1 It is recommended to use 0-6 layers of Polyimide and Mica.
 8.2 based on the application and design it is recommended to use a glass back Mica with binder (such as 1-2 layers, half-lapped) to subsequent layer other than the Armor or conductive tapes
 8.03 A final layer can consist of the following tapes: armor tape, conductive tape, and semi conductive tape, in various combinations as known in the art.

Although specifics regarding the structure/formation of this embodiment are set forth below, it is understood that certain modifications, substitutions, or adjustments could be made as understood by one of ordinary skill in the art.

Although specific brands and types of materials are provided in this application, it is understood that certain departures can be made from these specific items, as known to those in the art, with similar (though not necessarily as favorable) results.

PARTS LIST

Number No. Description
 10 insulated coil
 11 copper strand
 12 strand insulation
 13 turn tape/mica B stage turn tape
 14 ground wall/mica B stage ground wall
 15 film back mica
 16 conductive tape
 17 stress grading tape
 18 armor tape
 19 heat block
 20 heat block
 21 arrow
 22 arrow
 30 turn
 31 epoxy/epoxy melt/epoxy flow
 110 insulated coil
 210 insulated coil
 310 insulated coil All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A stator coil comprising:
multiple copper strands individually wrapped with polyimide insulation;
multiple turns, wherein each turn of the multiple turns comprises a grouping of at least two of the individually wrapped copper strands with polyimide insulation together;
a first ground wall layer wrapping all the turns, a second ground wall layer wrapping the first ground wall layer, and an armor tape wrapping the second ground wall layer;
wherein each turn of the multiple turns is wrapped with a turn tape, wherein the turn tape is a three-ply, B stage, solventless epoxy bonded mica paper tape;
wherein each turn is void free;
wherein the first ground wall layer is a three-ply, B stage, solventless epoxy bonded mica paper tape; and
wherein the second ground wall layer is a film back mica tape consisting of glass, mica and polyester layers.

2. The stator coil of claim 1, further comprising a third ground wall layer, wherein the third ground wall layer is wrapped around the second ground wall layer.

3. The stator coil of claim 2, wherein the third ground wall layer is a three-ply, B stage, solventless epoxy bonded mica paper tape.

4. The stator coil of claim 3, further comprising a conductive tape and a stress grading tape, wherein the conductive tape is wrapped around the third ground wall layer and the stress grading tape is wrapped around the conductive tape.

5. The stator coil of claim 1, wherein the stator coil is oven cured.

6. The stator coil of claim 1, wherein the first ground wall layer and second ground wall layer are wrapped in opposite directions.

7. A stator coil comprising:
polyimide insulated electrically conductive strands;
multiple turns comprising at least two of the polyimide insulated electrically conductive strands;
a first three-ply, B stage, solventless epoxy bonded mica paper tape wrapping each of the multiple turns;
a second three-ply, B stage, solventless epoxy bonded mica paper tape wrapping each of the multiple turns;
a film back mica tape wrapping each of the multiple turns, the film back tape consisting of glass, mica, and polyester layers; and
an armor tape wrapped over the film back tape.

8. The stator coil of claim 7, wherein the coil is hot-pressed.

9. The stator coil of claim 7, further comprising conductive tape.

10. The stator coil of claim 9, further comprising stress grading tape.

11. The stator coil of claim 10, wherein the conductive tape is wrapped around the second the-ply, B stage, solventless epoxy bonded mica paper tape.

12. The stator coil of claim 11, wherein the stress grading tape is wrapped around the conductive tape.

13. The method of claim 7, wherein the second B stage tape and film back tape are wrapped in opposite directions.

14. The method of claim 12, wherein the second B stage tape and film back tape are wrapped in opposite directions.

15. A stator coil comprising:
insulated copper strands;
multiple turns, wherein each turn of the multiple turns comprises a grouping of at least two of the multiple copper strands together;
a first three-ply, B stage, solventless epoxy bonded mica paper tape, wherein the first three-ply, B stage, solventless epoxy bonded mica paper tape is wrapped around each of the multiple turns;
a second three-ply, B stage, solventless epoxy bonded mica paper tape, wherein the second three-ply, B stage, solventless epoxy bonded mica paper tape is wrapped around the first three-ply, B stage, solventless epoxy bonded mica paper tape;
a film back mica tape, wherein the film back mica tape is wrapped around the second B stage tape and wherein the film back mica tape consists of glass, mica and polyester layers;
a third three-ply, B stage, solventless epoxy bonded mica paper tape, wherein the third three-ply, B stage, solventless epoxy bonded mica paper tape is wrapped around the film back tape; and
an armor tape, wherein the armor tape is wrapped around the third B stage tape.

16. The stator coil of claim 15, the insulation is polyimide insulation.

17. The stator coil of claim 15, wherein the second B stage tape and film back tape are wrapped in opposite directions.

18. The stator coil of claim 16, wherein the second B stage tape and film back tape are wrapped in opposite directions.

19. The stator coil of claim 15, wherein the stator coil is hot-pressed.

20. The stator coil of claim 15, further comprising a conductive tape and a stress grading tape.

* * * * *